United States Patent [19]

Hong

[11] Patent Number: 5,751,080
[45] Date of Patent: May 12, 1998

[54] SPINDLE MOTOR HAVING HYDRODYNAMIC BEARING

[75] Inventor: Weon Ki Hong, Kyunggi-do, Rep. of Korea

[73] Assignee: Samsung Electro-Mechanics Co., Ltd., Suwon, Rep. of Korea

[21] Appl. No.: 692,531

[22] Filed: Aug. 6, 1996

[30] Foreign Application Priority Data

May 29, 1996 [KR] Rep. of Korea .................. P96-18438

[51] Int. Cl.⁶ .................. H02K 7/00; H02K 5/24
[52] U.S. Cl. .................. 310/67 R; 310/51
[58] Field of Search .................. 359/20; 360/99.08; 310/90, 67 R, 51

[56] References Cited

U.S. PATENT DOCUMENTS

| | | | |
|---|---|---|---|
| Re. 34,412 | 10/1993 | Elsaesser et al. | 360/99.08 |
| 4,803,576 | 2/1989 | Ohkita et al. | 360/99.08 |
| 5,138,477 | 8/1992 | Omura et al. | 359/200 |
| 5,200,866 | 4/1993 | Fruge et al. | 360/99.08 |
| 5,422,769 | 6/1995 | Elsaesser et al. | 360/99.08 |
| 5,557,487 | 9/1996 | Elsaesser et al. | 360/99.08 |

*Primary Examiner*—Steven L. Stephan
*Assistant Examiner*—Michael J. Wallace, Jr.
*Attorney, Agent, or Firm*—Ladas & Parry

[57] ABSTRACT

The invention relates to a structure of a spindle motor. The spindle motor comprises a housing assembly arranged downward of a cover and having an inner cylindrical portion; a stator secured to circumferential outer surface of the inner cylindrical portion of the housing assembly; a spindle hub provided above the housing assembly and having an outer cylindrical portion; a rotor magnet secured to circumferential inner surface of the outer cylindrical portion of the spindle hub; a hydrodynamic bearing formed in the inner cylindrical portion of the housing assembly; a rotating shaft having one end secured to the spindle hub to integrally rotate with the spindle hub and the other end positioned in the hydrodynamic bearing; and restrainer disposed between the cover and the one end of the rotating shaft to restrain axial movement of the rotating shaft to a predetermined extent.

1 Claim, 3 Drawing Sheets

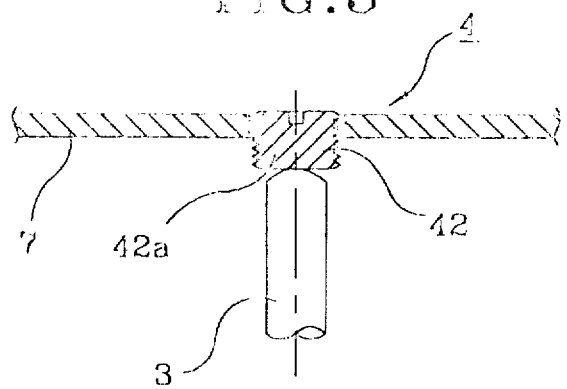
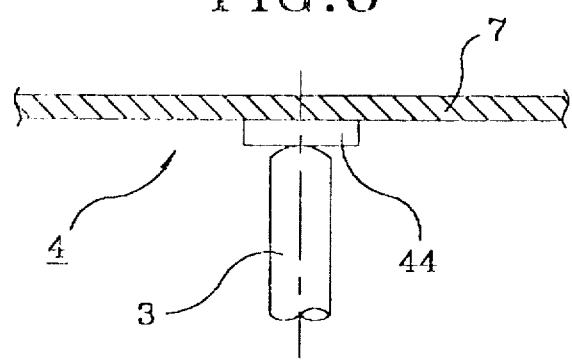
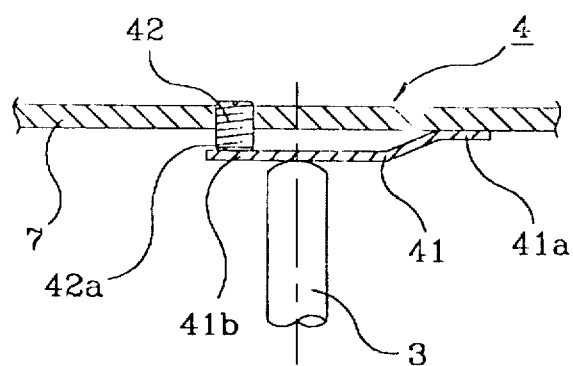
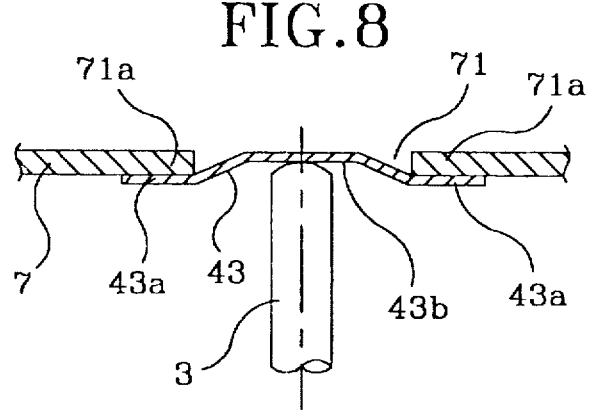

SPINDLE MOTOR HAVING HYDRODYNAMIC BEARING

BACKGROUND OF THE INVENTION

1. Field of the Invention

The present invention relates to a spindle motor used in a magnetic recorder/reproducer such as a hard disk drive (HDD) and the like, and more particularly to a spindle motor having a hydrodynamic bearing, in which axial upward movement of a rotating shaft is restrained to some extent to increase rigidity of the spindle motor.

2. Description of the Prior Art

Generally, a hard disk drive (HDD) is used to store information in a magnetic disk and to repeatedly read and write the information. Operation of the hard disk drive is implemented by the movement of the drive, and capacity and precision of the hard disk drive are determined by the closeness of disk track packing. Accordingly, a disk having tracks closely arranged has been developed and drive operation has been performed in a precise manner since the trend for new electronic products trend toward the hard disk drive having high capacity.

As hard disk drive performance is susceptible to asynchronous rotational vibration of a spindle motor used for driving the disk, a great effort has been expended for reducing the asynchronous rotational vibration. It is considered to be difficult for a ball bearing which is employed in an existing spindle motor to reduce the asynchronous rotational vibration. To solve this problem, while a hydrodynamic bearing has been adopted, the hydrodynamic bearing still suffers from several drawbacks as will be explained below.

Referring to FIG. 1, an axial thrust bearing c is provided the the lower end of a rotating shaft a in a hydrodynamic bearing b. Referring to FIG. 2, the lower end of the rotating shaft a is formed with a rounded portion d. In the hydrodynamic bearing b of FIGS. 1 and 2, the rotating shaft a is integrally secured to a spindle hub e, and is rotated integrally with the spindle hub e in a floating state. At this time, the rotating shaft a must not contact the lower surface of a cover f.

However, because the hydrodynamic bearing b supports a disk g only by using pressure of a hydrodynamic fluid, rigidity of the hydrodynamic bearing b is so low that the spindle hub e is apt to be shaken even by weak vibration and small external changes, whereby an error can be caused upon reading/writing operation. In addition, even though the read/write head is not moved, since a clearance exists between the cover f and the upper end of the spindle hub e, the spindle hub e is likely to be shaken even with small shocks or movement of a set, whereby the disk and the head can contact each other and cause damage to one another.

SUMMARY OF THE INVENTION

Accordingly, the present invention has been made in an effort to solve the problems occurring in the prior art, and an object of the present invention is to provide a spindle motor having a hydrodynamic bearing, in which axial upward movement of a rotating shaft is restrained to some extent to increase rigidity of the spindle motor and to prevent the head and a disk from generating an error and from being damaged.

According to one aspect of the present invention, there is provided a spindle motor comprising:

a housing assembly arranged downward of a cover and having an inner cylindrical portion; a stator secured to circumferential outer surface of the inner cylindrical portion of the housing assembly; a spindle hub provided above the housing assembly and having an outer cylindrical portion;

a rotor magnet secured to circumferential inner surface of the outer cylindrical portion of the spindle hub;

a hydrodynamic bearing formed in the inner cylindrical portion of the housing assembly;

a rotating shaft having one end secured to the spindle hub to integrally rotate with the spindle hub and the other end positioned in the hydrodynamic bearing; and restraining means disposed between the cover and the one end of the rotating shaft to restrain axial movement of the rotating shaft to a predetermined extent.

According to another aspect of the present invention, one end of the restraining means is fastened to the cover.

According to another aspect of the present invention, the restraining means comprises an elastic piece which is bent to have a step portion, one end of which is fastened to the cover, and the other end of which is positioned above the rotating shaft to force the rotating shaft to move downward.

According to another aspect of the present invention, the restraining means comprises a first screw, one end of which is threaded into a first threaded hole formed in the cover and the other end of which forces the rotating shaft to move downward.

According to another aspect of the present invention, the restraining means comprises a supporting member, one end of which is fastened to the cover and the other end of which forces the rotating shaft to move downward, the supporting member having a thickness corresponding to the space between the cover and the rotating shaft.

According to another aspect of the present invention, a second screw is provided above the other end of the elastic piece, one end of the second screw is threaded into a second threaded hole formed in the cover, and the other end of the second screw forces the rotating shaft to move downward.

According to still another aspect of the present invention, the restraining means comprises a plate member which is provided in an opening formed in the cover, a radial outward portion of the plate member being fastened to the cover and a radial inward portion being formed with a concave portion for forcing the rotating shaft to move downward.

By the features of the present invention, shaking of a disk even by weaks vibration and small external changes is effectively suppressed, an error is not generated in a reading/writing operation, and even when the drive is not operated, since a clearance does not exist between the cover and the spindle hub, shaking of the spindle hub can not be effected even with mild shocks or movement of a set, whereby the hard disk drive can always be perfectly protected.

BRIEF DESCRIPTION OF THE DRAWINGS

The above objects, and other features and advantages of the present invention will become more apparent after a reading of the following detailed description taken in conjunction with the drawings, in which:

FIGS. 5 through 8 are enlarged cross-sectional views of other spindle motors in accordance with other embodiments of the present invention.

DETAILED DESCRIPTION OF PREFERRED EMBODIMENTS

Hereinafter, spindle motors in accordance with preferred embodiments of the present invention will be described in greater detail with reference to the drawings.

Figure 1:
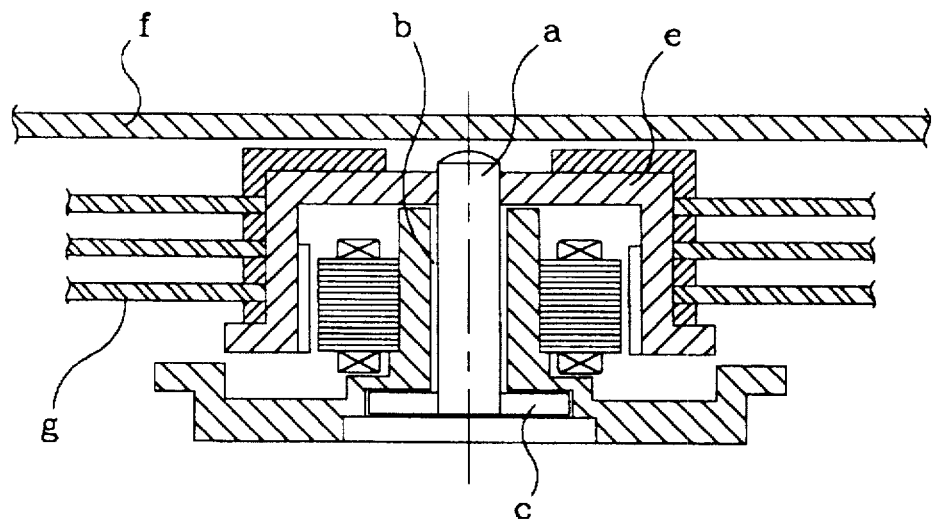
FIG. 1 is a cross-sectional view of a conventional spindle motor having a hydrodynamic bearing.
Figure 2:
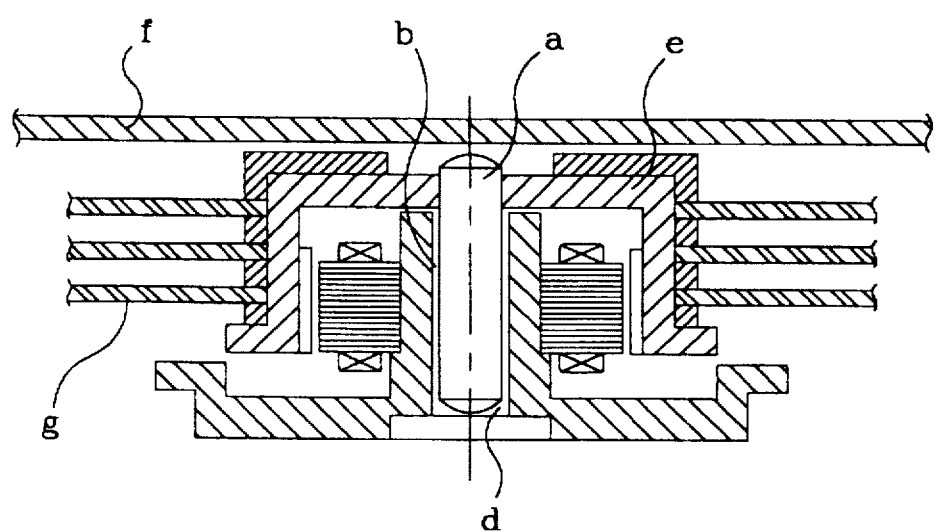
FIG. 2 is a cross-sectional view of another conventional spindle motor having a hydrodynamic bearing.
Figure 3:
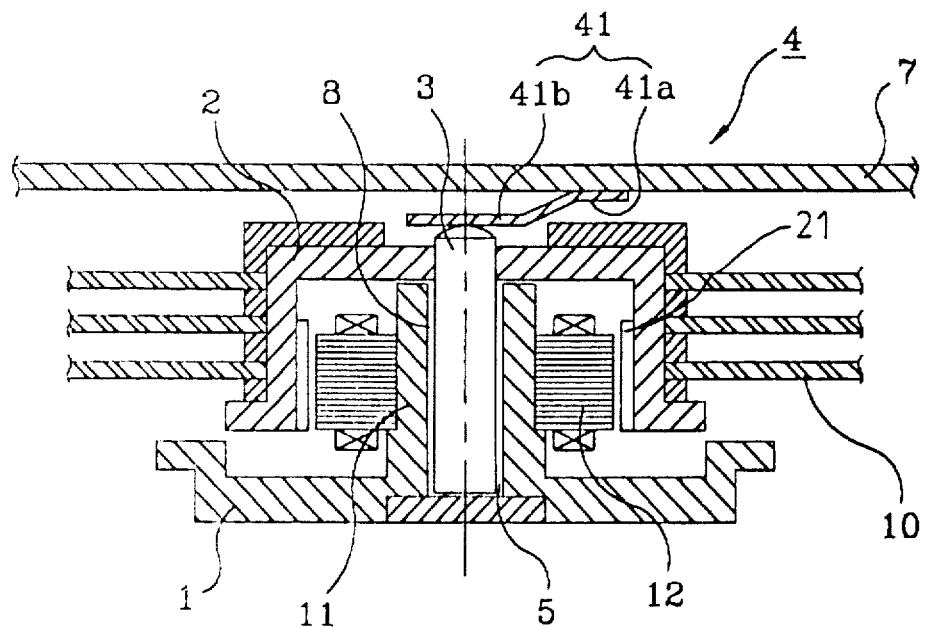
FIG. 3 is a cross-sectional view of a spindle motor in accordance with a first embodiment of the present invention.
Figure 4:
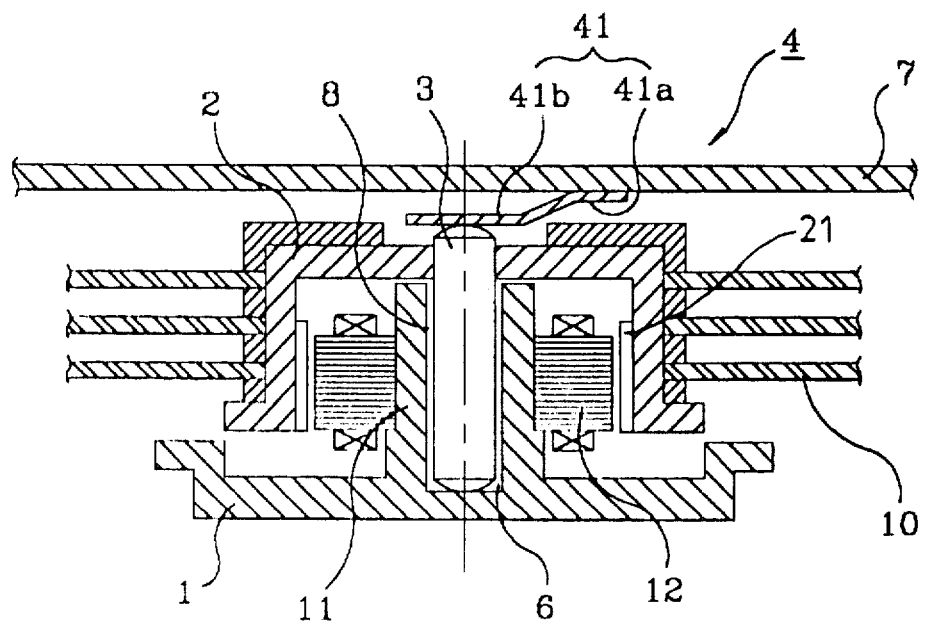
FIG. 4 is a cross-sectional view of a spindle motor in accordance with a second embodiment of the present invention.

Referring to FIGS. 3 and 4, a spindle motor according to the present invention is arranged below of a cover 7 and includes a housing assembly 1, a spindle hub 2 and a rotating shaft 3. The rotating shaft 3 is secured to the center of the spindle hub 2 to integrally rotate therewith. The housing assembly 1 is formed with an inner cylindrical portion 11, and a stator 12 is secured to the circumferential outer surface of the inner cylindrical portion 11. The spindle hub 2 is formed with an outer cylindrical portion, and a rotor magnet 21 is secured to the inner surface of the outer cylindrical portion. The rotating shaft 3 is inserted into a hydrodynamic bearing 8 formed in the inner cylindrical portion 11. In FIG. 3, an axial thrust bearing 5 is provided at the lower end of the rotating shaft 3; and in FIG. 4, the lower end of the rotating shaft 3 is formed with a rounded portion 6.

According to the present invention, a restrainer 4 is disposed between the cover 7 and the upper free end of the rotating shaft 3 to restrain axial upward movement of the shaft 3 when it is rotated and to prevent the rotating shaft 3 from being shaken when not rotated. As best shown in FIGS. 3 and 4, the restrainer 4 comprises an elastic piece 41, and the elastic piece 41 is bent to have a sloped step portion in the middle thereof. One end 41a of the elastic piece 41 is fastened to the lower surface of the cover 7, and the other end 41b of the elastic piece 41 is positioned above the upper end of the rotating shaft 3 to force it to move downward.

When the spindle hub 2 of the spindle motor is rotated in the hydrodynamic bearing 8, as the upper end of the rotating shaft 3 is pushed downward to some extent by the restrainer 4, the force supporting the spindle hub 2 and rigidity of the spindle hub 2 are increased, whereby upward and downward movement of the spindle hub 2 can be suppressed even at high speed. Also, when the spindle hub 2 is not rotated, it is prevented from being shaken. Reference numeral 10 represents a hard disk.

The present invention can be embodied otherwise, as shown in FIGS. 5 through 8.

Referring now to FIG. 5, a threaded hole is defined in the cover 7, and a screw 42 is provided in the threaded hole. The upper end of the screw 42 is threaded into the threaded hole, and the lower end 42a functions to force the rotating shaft 3 to move downward. By virtue of the screw 42 of the present embodiment, it is possible to finely adjust the force applied to the rotating shaft 3.

Referring to FIG. 6, a supporting member 44 made from synthetic resins is sandwiched between the lower surface of the cover 7 and the rotating shaft 3 to directly force the rotating shaft 3 to move downward. The supporting member 44 has a thickness which corresponds to the distance between the cover 7 and the rotating shaft 3.

Referring to FIG. 7, in addition that one end 41a of the elastic piece 41 is fastened to the lower surface of the cover 7 and the other end 41b of the elastic piece 41 is positioned above the upper end of the rotating shaft 3 to force the shaft to move downward as in FIGS. 3 and 4, the screw 42 is provided above the other end of the elastic piece 41. The upper end of the screw 42 is threaded into the threaded hole formed in the cover 7, and the lower end 42a of the screw 42 functions to force the other end of the elastic piece 41 to move downward. By virtue of the elastic piece 41 and the screw 42 of the present embodiment, it is possible to use elastic force and to finely adjust the force applied to the rotating shaft 3.

Referring to FIG. 8, an opening 71 is formed in the cover 7 above the upper end of the rotating shaft 3, and a circular plate 42 is provided in the opening 71. A radial outer portion 43a of the circular plate 42 is attached to the lower surface of the cover 7, and the radial inner portion of the circular plate 42 is formed with a concave portion 43b in the area corresponding to the opening 71. The concave portion 43b acts to force the rotating shaft 3 to move downward.

As a result, the spindle motor according to the present invention, constructed as mentioned above, provides advantages in that since the restrainer 4 fastened to the cover 7 forces the rotating shaft 3 to move downward to prevent the rotating shaft 3 from being shaken, shaking of a disk even by weak vibrations and small external changes is effectively suppressed and errors are not generated during a reading/writing operation, and in that even when the drive is not operated, since a clearance does not exist between the cover and the spindle hub, shaking of the spindle hub can not be effected even with small shocks or movements of a set, whereby the hard disk drive can always be perfectly protected.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A spindle motor comprising:

a cover, a housing assembly arranged below said cover and having an inner cylindrical portion;

a stator secured to a circumferential outer surface of the inner cylindrical portion of the housing assembly;

a spindle hub provided above the housing assembly and having an outer cylindrical portion;

a rotor magnet secured to a circumferential inner surface of the outer cylindrical portion of the spindle hub;

a hydrodynamic bearing formed in the inner cylindrical portion of the housing assembly;

a rotatable shaft having an upper end portion secured to the spindle hub to cause the shaft to rotate with the spindle hub, said shaft extending downwardly from said upper end portion into the hydrodynamic bearing and having a lower end rotatably supported by said housing assembly, said upper end portion of the shaft having a free upper end spaced from said cover, and restraining means disposed between the cover and said free, upper end of the shaft to restrain axial movement of the shaft upwardly relative to said cover both when the shaft is rotating and not rotating.

said restraining means comprising a plate member which is provided in an opening formed in the cover above said free, upper end of the shaft, a radial outward portion of the plate member being fastened to the cover and a radial inward portion of the plate member being formed with a concave portion for engaging said free, upper end of the shaft to force the shaft to move downward.

* * * * *